Patented Mar. 16, 1937

2,073,671

UNITED STATES PATENT OFFICE 2,073,671

MANUFACTURE OF AMINES

Chester E. Andrews, Brookline, Pa., assignor to The Röhm & Haas Company, Philadelphia, Pa.

No Drawing. Application April 2, 1931
Serial No. 527,352

7 Claims. (Cl. 260—127)

This invention relates to the process for the production of amines by the reaction of an alcohol with ammonia or a substituted ammonia in the vapor phase in the presence of a catalyst.

The reactions involved can be represented generally as follows in which R may be any aliphatic or aromatic hydrocarbon radicle and it may represent different radicles in the same reaction thus giving rise to mixed amines.

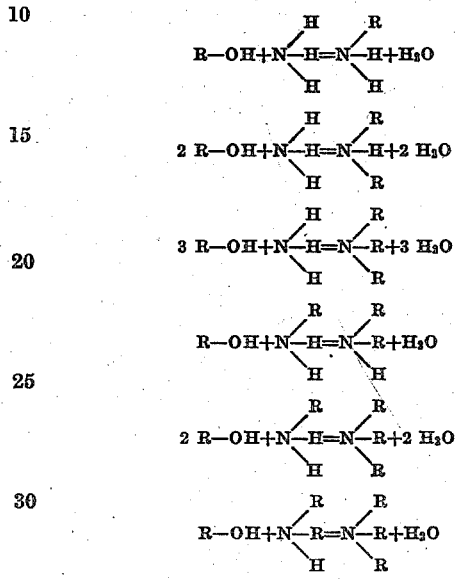

Alumina, thoria, blue oxide of tungsten, titania, chromic oxide, blue oxide of molybdenum and zirconia have been mentioned in the literature for use as catalysts in carrying out these reactions but their effectiveness is so low that no practical application has been made of their use.

According to the present invention I have found that amines can be readily prepared by passing ammonia or a substituted ammonia and an alcohol in the vapor phase over or otherwise in contact with a heated catalyst or contact mass containing phosphorus and especially one or more of the oxygen acids of phosphorus, their anhydrides, their polymers, and their salts; for example, orthophosphoric acid, metaphosphoric acid, pyrophosphoric acid, phosphorous pentoxide, dimetaphosphoric acid, trimetaphosphoric acid, primary ammonium phosphate, secondary ammonium phosphate, normal ammonium phosphate, ammonium metaphosphate, secondary ammonium pyrophosphate, normal ammonium pyrophosphate, aluminum phosphate, aluminum acid phosphate and mixtures of two or more of such materials.

The reaction is carried out at temperatures ranging from 250° C. to 500° C. and preferably about 300° C. to 400° C.

In performing the invention I may pass the alcohol and ammonia or substituted ammonia in the vapor phase over or through the catalyst or contact mass heated to the desired temperature, the catalytic materials being employed as such or spread upon or deposited on or mixed with materials such for example as pumice, silica gel, diatomaceous earth, quartz, filter stone, earthenware, graphite, minerals rich in silica, metals, metal oxides and salts, asbestos, stone, rock, slag, cements, sand and so forth.

The reaction may be carried out in any of the well known types of converter design used for this kind of reaction such as tubular converters with or without a fluid bath for temperature control or converters in which the catalyst is spread in successive layers with or without heat exchangers between the layers. It is understood that the apparatus which is used forms no part of this invention and that the above types are mentioned for illustrative purposes only.

Pressures above or below atmospheric may be used without altering the purpose of this invention.

As is characteristic of this type of reaction a mixture of amines together with certain quantities of unreacted starting materials is obtained depending upon the operating conditions and the materials used. The products are collected and purified by any suitable or well-known means. In certain cases the products can be purified by methods based on the difference in chemical behavior of the primary, secondary and tertiary amines when allowed to react with other compounds. Purification may also be accomplished by conversion of the amines to salts and extraction with suitable solvents. The purification step forms no part of the invention and is not claimed.

If desired, any unreacted starting material can be removed from the products and passed again through the reaction zone.

*Example #1.*—A dilute solution of ortho phosphoric acid containing 500 gm. of acid is sprayed on to one liter of crushed pumice with constant stirring and the temperature held above the boiling point of the solution. Methyl alcohol vapor and ammonia in the proportion of one gm. of methyl alcohol to 1.5–2.5 liters of ammonia are passed over the catalysts in a suitable reaction vessel at temperatures preferably between 250 and 500° C. A high yield of monomethylamine is obtained together with some unreacted methyl alcohol, ammonia, water and di- and trimethylamines.

*Example #2.*—Methyl alcohol and aniline vapor in the proportion of 100 gm. of methyl alcohol to 72 gm. of aniline are passed over the catalyst described in Example #1 at temperatures preferably between 250 and 500° C. A high yield of dimethyl aniline is obtained together with excess methyl alcohol and small amounts of aniline and monomethyl aniline.

*Example #3.*—A dilute solution of secondary ammonium phosphate containing 396 gm. of the phosphate is slowly evaporated to dryness with one liter of crushed filter stone. Methyl alcohol and monomethylamine vapor in the proportion of 100 gm. methyl alcohol to 72–216 liters of monomethylamine are passed over the catalyst in a suitable reaction vessel at temperatures preferably between 250 and 500° C. A high yield of di- and trimethylamine is obtained.

*Example #4.*—Two dilute solutions are made:
1. Contains 132 gm. secondary ammonium phosphate.
2. Contains 333 gm. aluminum sulphate.

Solutions 1 and 2 are mixed and the precipitate filtered off. The precipitate of aluminum phosphate is taken up in more water and again filtered. This is repeated until all sulphate has been removed. The washed precipitate is suspended in water and sprayed on to 300 cc. of hot crushed pumice or evaporated with the pumice with constant stirring. Ethyl alcohol and ammonia in the proportion of 10 gm. ethyl alcohol to 4–12 liters of ammonia are passed over the catalyst at 250–500° C. in a suitable reaction vessel. A good yield of mono ethyl amine is obtained.

*Example #5.*—Two solutions are made:
1. Dilute solution of aluminum sulphate containing 333 gm. of aluminum sulphate.
2. Dilute solution of orthophosphoric acid containing 294 gm. of orthophosphoric acid.

Solution 1 is treated with sufficient dilute ammonia water to precipitate the aluminum as the hydrate. The precipitate is washed by decantation and filtration to free it of sulphates. The washed precipitate is suspended in water. Solution 2 is added to the aluminum hydrate suspension and sprayed on to one liter of hot crushed pumice which is kept agitated. Methyl alcohol and ammonia in the proportion of 10 gm. of methyl alcohol to 3–7 liters of ammonia are passed over the catalyst at temperatures preferably between 250 and 500° C. A particularly high yield of di- and trimethylamine is obtained.

*Example #6.*—66 gm. diammonium phosphate are dissolved in small amount of water and 74 gm. of finely powdered diatomaceous earth (Silo-cel) are impregnated with this solution. Sufficient water is added to form a very stiff paste. This can be dried at approximately 100° C. and broken up into any desired size particles. This paste can also be formed into pellets of any desired shape or size. When methyl alcohol vapor and ammonia under the conditions mentioned in Example #1 are passed over this catalyst a high yield of monomethylamine is obtained. Di- and trimethylamine are produced to a much lesser extent.

*Example #7.*—A dilute solution of metaphosphoric acid containing 400 gm. of acid is sprayed on to one liter of crushed pumice with constant stirring and the temperature held above the boiling point of the solution. Normal butyl alcohol vapor and ammonia in the proportion of 148 gm. of normal butyl alcohol to 68 gm. of ammonia are passed over the above catalyst in a suitable reaction vessel at temperatures between 250° C. and 500° C. A mixture of primary, secondary and tertiary butyl amines is produced together with some unreacted butyl alcohol and ammonia.

*Example #8.*—A dilute solution of orthophosphoric acid containing 500 gm. of the acid is sprayed onto a liter of crushed pumice with constant stirring and the temperature held above the boiling point of the solution. Continue to heat the mixture up to the point of redness for a short time. A considerable amount of the acid is converted to polymers of pyrophosphoric acid such as $(H_4P_2O_7)_4$ or $(H_4P_2O_7)_5$. Dimethyl amine and methyl alcohol in the proportion of 22 gm. of dimethyl amine and 46 gm. methyl alcohol vapor are passed over the above catalyst at temperatures between 250° C. and 500° C. Trimethyl amine and some unreacted dimethyl amine and methyl alcohol are produced.

*Example #9.*—213 gm. of phosphorus pentoxide are sublimed onto one liter of crushed pumice with constant agitation in a suitable container. A mixture of 30 gm. normal propyl alcohol and 25 gm. ammonia in the vapor phase is passed over the above catalyst in a suitable reaction vessel at temperature between 250° and 500° C. A mixture of the three possible propylamines is obtained together with some unreacted propyl alcohol and ammonia.

It should be understood that the above examples are given merely to illustrate the invention and that variation in operating conditions, temperatures, etc. are possible without departing from the scope of the invention.

What I claim is:

1. In the art of producing amines by reacting an alcohol with one of the class consisting of ammonia and primary and secondary amines the improvement which consists in carrying out such reaction in the presence of a catalyst containing an oxygen compound of phosphorus which catalyst is in intimate association with a compatible carrier.

2. In the art of producing amines by reacting an alcohol with one of the class consisting of ammonia and primary and secondary amines the improvement which consists in carrying out such reaction in the presence of a catalyst containing a compound of phosphorus containing a phosphoric acid radical which catalyst is in intimate association with a compatible carrier.

3. In the art of producing amines by reacting an alcohol with one of the class consisting of ammonia and primary and secondary amines the improvement which consists in carrying out such reaction in the vapor phase in the presence of a catalyst containing secondary ammonium phosphate.

4. In the art of producing amines by reacting an alcohol with one of the class consisting of ammonia and primary and secondary amines the improvement which consists in carrying out such reaction in the vapor phase in the presence of a catalyst containing phosphorus which catalyst is in intimate association with a compatible carrier.

5. A process for the production of dimethyl amine which comprises passing a mixture of gaseous mono-methyl amine and methanol at reaction temperatures over an amination catalyst.

6. A process for the production of a methylamine of the formula $NH_{3-x}(CH_3)_x$, where $x$ equals one of the numbers 2 and 3, which comprises passing a mixture of methanol and a methyl amine of the formula $NH_{4-x}(CH_3)_{x-1}$ over an amination catalyst at reaction temperatures.

7. In the art of producing amines by reacting an alcohol with one of the class consisting of ammonia and primary and secondary amines, the improvement which consists in carrying out such reaction in the vapor phase in the presence of a catalyst containing secondary ammonium phosphate, which catalyst is in intimate association with a compatible carrier.

CHESTER E. ANDREWS.